United States Patent
Yamagame et al.

(10) Patent No.: US 11,931,829 B2
(45) Date of Patent: Mar. 19, 2024

(54) FLUX AND SOLDER PASTE

(71) Applicant: SENJU METAL INDUSTRY CO., LTD., Tokyo (JP)

(72) Inventors: Tomohiro Yamagame, Tokyo (JP); Yo Yamada, Tokyo (JP)

(73) Assignee: SENJU METAL INDUSTRY CO., LTD., Tokyo (JP)

( * ) Notice: Subject to any disclaimer, the term of this patent is extended or adjusted under 35 U.S.C. 154(b) by 0 days.

(21) Appl. No.: 18/022,656

(22) PCT Filed: Aug. 20, 2021

(86) PCT No.: PCT/JP2021/030666
§ 371 (c)(1),
(2) Date: Feb. 22, 2023

(87) PCT Pub. No.: WO2022/050095
PCT Pub. Date: Mar. 10, 2022

(65) Prior Publication Data
US 2023/0256547 A1 Aug. 17, 2023

(30) Foreign Application Priority Data
Sep. 1, 2020 (JP) ................. 2020-146467

(51) Int. Cl.
*B23K 35/362* (2006.01)
*B23K 35/02* (2006.01)
*B23K 35/36* (2006.01)

(52) U.S. Cl.
CPC .......... *B23K 35/362* (2013.01); *B23K 35/025* (2013.01); *B23K 35/3615* (2013.01); *B23K 35/3618* (2013.01)

(58) Field of Classification Search
None
See application file for complete search history.

(56) References Cited

U.S. PATENT DOCUMENTS

2002/0017337 A1* 2/2002 Arora ................. B23K 35/3618
524/270

FOREIGN PATENT DOCUMENTS

| JP | 2004-501765 A | 1/2004 |
|---|---|---|
| JP | 2016-179496 A | 10/2016 |
| JP | 6751248 B1 | 9/2020 |
| WO | 2001/87535 A2 | 11/2001 |

OTHER PUBLICATIONS

Machine translation of JP 2016-179496A. (Year: 2016).*
International Search Report (PCT/ISA/210) of the International Searching Authority issued by the Japan Patent Office for International Patent Application No. PCT/JP2021/030666, dated Nov. 2, 2021, with a partial English translation.
Notice of Reasons for Refusal issued by Japan Patent Office for corresponding Japan Patent Application 2020-146467 dated Dec. 8, 2020, with English translation.

* cited by examiner

*Primary Examiner* — Xiaowei Su
(74) *Attorney, Agent, or Firm* — Myers Wolin, LLC

(57) ABSTRACT

A flux containing 0.1 to 20 wt % of 2-hydroxyisobutyric acid as an activator, 10 to 60 wt % of a cationic surfactant and 5 to 60 wt % of a nonionic surfactant. A solder paste contains a flux containing 0.1 to 20 wt % of 2-hydroxyisobutyric acid as an activator, 10 to 60 wt % of a cationic surfactant, and 5 to 60 wt % of a nonionic surfactant and a metal powder.

14 Claims, No Drawings

FLUX AND SOLDER PASTE

CROSS-REFERENCE TO RELATED APPLICATION

This application is a National Stage application under 35 U.S.C. 371 of International Application No. PCT/JP2021/030666, filed on Aug. 20, 2021 and designated the U.S., which claims priority to Japanese Patent Application No. 2020-146467, filed on Sep. 1, 2020. The contents of each are herein incorporated by reference.

FIELD

The present disclosure relates to a flux that is used for soldering and a solder paste using this flux.

BACKGROUND

Ordinarily, a flux is used in soldering. The flux chemically removes metal oxides that are present on the surface of solder and metal oxides present on the metallic surface of a subject of soldering. This makes it possible for metal elements to migrate in the boundary between the solder and the subject and makes both strongly joined together.

Fluxes are classified into resin fluxes, water-soluble fluxes and inorganic fluxes. The resin fluxes are fluxes obtained by adding an activator to a resin such as rosin or a synthetic resin. The water-soluble fluxes are fluxes obtained by dissolving an organic acid activator in a solvent such as water or an organic solvent. In addition to the organic acid activator, polyethylene glycol, a water-soluble base agent or the like is added to the water-soluble fluxes in some cases. The inorganic fluxes are fluxes for which an inorganic material such as hydrochloric acid or zinc chloride is used.

A solder paste is a composite material obtained by mixing the powder of a solder alloy and a flux. Soldering using the solder paste is performed, for example, as described below. First, the solder paste is printed in a soldering portion such as an electrode on a substrate. Subsequently, a component is mounted on the soldering portion. In addition, the substrate is heated in a heating furnace that is called a reflow furnace. This makes the component joined to the soldering portion. Hereinafter, a soldering portion to which a component has been joined will also be referred to as "solder joint portion".

PTL 1 discloses a water-soluble flux containing an acid anhydride having 20 or less carbon atoms, a surfactant and a base resin. In this flux, the acid anhydride absorbs water and thereby functions as an activator. The surfactant is added to make a low-molecular-weight polar molecule such as water compatible with the flux components. As the surfactant, an anionic surfactant, a cationic surfactant, an amphoteric surfactant and a nonionic surfactant are exemplified. PTL 1 also discloses an example where a flux containing the above-described essential components suppressed the generation of voids in a soldering portion.

CITATION LIST

Patent Literature

[PTL 1] JP 2016-179496 A

SUMMARY

Technical Problem

Incidentally, the objective of adding a surfactant to fluxes is typically to improve the wettability of solder during soldering. However, the surfactant itself is also a causative substance of voids. Therefore, in soldering where a flux containing a surfactant as an essential component is used, development of a technique for suppressing the generation of voids in a solder joint portion is also important from the viewpoint of studying an alternative of the flux of PTL 1.

One objective of the present disclosure to suppress the generation of voids in a solder joint portion in soldering where a flux containing a surfactant as an essential component is used. Another objective of the present disclosure is to provide a solder paste using such a flux.

As a result of adding 2-hydroxyisobutyric acid (hereinafter, also referred to as "HBA") to a flux containing cationic and nonionic surfactants, the present inventors found a possibility that the generation of voids can be suppressed compared with fluxes to which no HBA is added. Therefore, the present inventors performed additional studies, consequently found that, when the contents of these components are each within an appropriate range, the generation of voids can be sufficiently suppressed and completed the present disclosure.

A first disclosure is a flux having the following characteristics.

The flux contains
0.1 to 20 wt % of 2-hydroxyisobutyric acid as an activator,
10 to 60 wt % of a cationic surfactant and
5 to 60 wt % of a nonionic surfactant.

A second disclosure further has the following characteristic in the first disclosure.

A content of the 2-hydroxyisobutyric acid is 1 to 10 wt %.

A third disclosure further has the following characteristic in the first or second disclosure.

The cationic surfactant is an alkylene oxide adduct of an aliphatic monoamine or aliphatic diamine.

A fourth disclosure further has the following characteristic in the first to third disclosure.

The nonionic surfactant is at least one of an alkylene oxide adduct of an aliphatic monohydric alcohol or aromatic polyhydric alcohol or a sorbitan fatty acid ester.

A fifth invention disclosure has the following characteristic in the first to fourth disclosures.

The flux further contains a co-activator.

The co-activator is at least one of an organic acid other than the 2-hydroxyisobutyric acid, an amine, an organophosphorus compound, an organosulfur compound, an organohalogen compound and an amine hydrohalide.

A sixth disclosure further has the following characteristic in the fifth disclosure.

A content of the other organic acid is more than 0 wt % and 10 wt % or less.

A seventh disclosure further has the following characteristic in the fifth or sixth disclosure.

A content of the amine is more than 0 wt % and 5 wt % or less.

An eighth disclosure further has the following characteristic in any one of the fifth to seventh disclosures.

A content of the organophosphorus compound is more than 0 wt % and 3 wt % or less.

A ninth disclosure further has the following characteristic in any one of the fifth to eighth disclosures.

A content of the organosulfur compound is more than 0 wt % and 3 wt % or less.

A tenth disclosure further has the following characteristic in any one of the fifth to ninth disclosures.

A content of the organohalogen compound is more than 0 wt % and 5 wt % or less.

An eleventh disclosure further has the following characteristic in any one of the fifth to tenth disclosures.

A content of the amine hydrohalide is more than 0 wt % and 2 wt % or less.

A twelfth disclosure further has the following characteristic in any one of the first to eleventh disclosures.

The flux further contains more than 0 wt % and 5 wt % or less of a resin composition.

A thirteenth disclosure further has the following characteristic in any one of the first to twelfth disclosures.

The flux further contains more than 0 wt % and 76 wt % or less of a solvent.

A fourteenth disclosure is a solder paste having the following characteristic.

The solder paste contains the flux according to any one of the first to thirteenth disclosures and a metal powder.

An embodiment of the present disclosure will be described in detail below. In the present application, "wt %" means "mass %". In addition, wt % of a component that configures a flux is based on the mass of the entire flux. In addition, in a case where a numerical range is expressed using "to", the range is regarded as including numerical values at both ends.

1. Flux

A flux according to the embodiment contains HBA as an activator and cationic and nonionic surfactants as essential components. Hereinafter, these components and the content of each component (content proportion) will be described in detail.

1-1. HBA

HBA is an organic acid having a structure in which a carboxy group is bonded to a carbon atom having a methyl group and a hydroxy group. The content of HBA is 0.1 to 20 wt %. When the content of HBA is smaller than 0.1 wt %, the oxide reduction action of HBA becomes weak, and the wettability of solder during soldering deteriorates. When the content of HBA is larger than 20 wt %, HBA makes it easy for the metallic surface of a subject of soldering to be corroded. The content of HBA is preferably 1 to 10 wt % and more preferably 1 to 5 wt %. When the content of HBA is within this range, it becomes possible to remove oxides while suppressing the corrosion of the metallic surface by HBA.

1-2. Cationic and Nonionic Surfactants 1-2-1. Cationic Surfactant

As the cationic surfactant, an organic amine alkylene oxide (A0)-type cationic surfactant and a polyoxyalkyleneamine-type cationic surfactant are exemplified.

The organic amine AO-type surfactant has a structure in which at least one AO selected from ethylene oxide (EO), propylene oxide (PO) and butylene oxide (BO) is added to an organic amine such as an aliphatic amine (aliphatic monoamine or polyamine (aliphatic diamine or aliphatic triamine)) or an aromatic amine (aromatic monoamine or polyamine (aromatic diamine or aromatic triamine)). As the organic amine AO-type surfactant, an AO adduct of an aliphatic monoamine or aliphatic diamine is preferably used, and an EO adduct of an aliphatic monoamine and a PO adduct of an aliphatic diamine are more preferably used.

The polyoxyalkyleneamine-type surfactant has a repeating unit of an oxyalkylene block such as an oxyethylene block or an oxypropylene block in the molecule and has a structure in which amino groups bond to carbon atoms at the terminals. The polyoxyalkyleneamine-type surfactant is classified into a monoamine type, a diamine type and a triamine type depending on the total number of terminal amino groups. As the polyoxyalkyleneamine-type surfactant, a polyoxydiamine-type surfactant is preferably used, and a polyoxyalkylenediamine-type surfactant having a repeating unit of an oxyethylene block and an oxypropylene block in the molecule and having amino groups bonding to carbon atoms at both terminals is more preferably used.

The content of the cationic surfactant (in a case where two or more cationic surfactants are used, the total content thereof) is 10 to 60 wt %. When the content of the cationic surfactant is smaller than 10 wt %, the wettability of solder during soldering deteriorates. When the content of the cationic surfactant is larger than 60 wt %, voids are likely to be generated. From the viewpoint of achieving both improvement in wettability and suppression of the generation of voids, the content of the cationic surfactant is preferably 20 to 46 wt % and more preferably 30 to 46 wt %.

1-2-2. Nonionic Surfactant

As the nonionic surfactant, an alcohol ether-type nonionic surfactant and a carboxylic acid ester-type nonionic surfactant are exemplified.

The alcohol ether-type surfactant has a structure in which at least one AO selected from ethylene oxide (EO), propylene oxide (PO) and butylene oxide (BO) is added to an aliphatic alcohol (including a monohydric alcohol and a polyhydric alcohol) or an aromatic alcohol (including a monohydric alcohol and a polyhydric alcohol). As the aliphatic monohydric alcohol, lower alcohols such as methanol, ethanol and butanol and higher alcohols such as cetyl alcohol, stearyl alcohol, behenyl alcohol and oleyl alcohol are exemplified. As the aromatic monohydric alcohol, phenol and benzyl alcohol are exemplified. As the aromatic polyhydric alcohol, resorcinol is exemplified.

As the alcohol ether-type surfactant, an AO adduct of an aliphatic monohydric alcohol or aromatic polyhydric alcohol is preferably used, and polyethylene glycol (PEG), polypropylene glycol (PPG), a copolymer of PEG and PPG and an EO adduct of resorcinol are more preferably used.

The carboxylic acid ester-type surfactant is an ester of an aliphatic carboxylic acid (including monocarboxylic acid and polyhydric carboxylic acid) or aromatic carboxylic acid (including monocarboxylic acid and polyhydric carboxylic acid) and an aliphatic alcohol (including a monohydric alcohol and a polyhydric alcohol) or an aromatic alcohol (including a monohydric alcohol and a polyhydric alcohol). As the carboxylic acid ester-type surfactant, a sorbitan fatty acid ester (an ester of aliphatic carboxylic acid and sorbitan) is preferably used, and sorbitan monolaurate and sorbitan monostearate are more preferably used.

The content of the nonionic surfactant (in a case where two or more nonionic surfactants are used, the total content thereof) is 5 to 60 wt %. When the content of the nonionic surfactant is smaller than 5 wt %, the wettability of solder during soldering deteriorates. When the content of the nonionic surfactant is larger than 60 wt %, it becomes difficult for the flux to vaporize during soldering. From this viewpoint, the upper limit of the content of the nonionic surfactant is preferably as low as possible. Specifically, the upper limit is preferably 50 wt % and more preferably 45 wt %.

1-3. Co-Activator

The flux according to the embodiment may contain a co-activator. That is, the flux according to the embodiment contains a co-activator as an optional component. The co-activator is an additive that aids the reduction of oxides by HBA. As the co-activator, an organic acid other than HBA, an amine, an organophosphorus compound, an organosulfur compound, an organohalogen compound and an amine hydrohalide are exemplified. Two or more of these co-activators may be used at the same time.

1-3-1. Other Organic Acid

As the other organic acid, glutaric acid, adipic acid, azelaic acid, eicosanedioic acid, citric acid, glycolic acid, lactic acid, succinic acid, salicylic acid, diglycolic acid, dipicolinic acid, dibutylaniline diglycolic acid, suberic acid, sebacic acid, thioglycolic acid, phthalic acid, isophthalic acid, terephthalic acid, dodecanedioic acid, parahydroxyphenylacetic acid, picolinic acid, phenylsuccinic acid, fumaric acid, maleic acid, malonic acid, lauric acid, benzoic acid, tartaric acid, tris(2-carboxyethyl) isocyanurate, glycine, 1,3-cyclohexanedicarboxylic acid, 2,2-bis(hydroxymethyl)propionic acid, 2,2-bis(hydroxymethyl)butanoic acid, 4-tert-butylbenzoic acid, 2,3-dihydroxybenzoic acid, 2,4-diethylglutaric acid, 2-quinolinecarboxylic acid, 3-hydroxybenzoic acid, malic acid, p-anisic acid, palmitic acid, stearic acid, 12-hydroxystearic acid, oleic acid, linoleic acid and linolenic acid are exemplified. As the other organic acid, in addition, a dimer acid that is a reaction product of oleic acid and linoleic acid, a hydrogenated dimer acid containing hydrogen added to this dimer acid, a trimer acid that is a reaction product of oleic acid and linoleic acid and a hydrogenated trimer acid containing hydrogen added to this trimer acid are exemplified. As the other organic acid, furthermore, a dimer acid other than a reaction product of oleic acid and linoleic acid, a hydrogenated dimer acid containing hydrogen added to this dimer acid, a trimer acid other than a reaction product of oleic acid and linoleic acid and a hydrogenated trimer acid containing hydrogen added to this trimer acid are exemplified. Two or more of these other organic acids may be used at the same time.

The content of the other organic acid (in a case where two or more other organic acids are used, the total content thereof) is 0 to 10 wt %. A preferable upper limit of the content of the other organic acid is changed as appropriate depending on the use or objective of the flux. For example, in a case where the reduction action of the flux is emphasized, this upper limit is 2.0 wt %. When a change of the flux over time needs to be suppressed, this upper limit is 0.5 wt %. The content of the other organic acid is preferably equal to or less than the content of HBA. That is, the content percentage of the other organic acid relative to all organic acids including HBA and the other organic acid is preferably 50% or less. When the content percentage of the other organic acid is 50% or less, it becomes possible to suppress corrosion of the metallic surface by the other organic acid while aiding the reduction of oxides by HBA. The content percentage of the other organic acid is preferably 40% or less.

1-3-2. Amine

As the amine, monoethanolamine, diphenylguanidine, ditolylguanidine, ethylamine, triethylamine, cyclohexylamine, ethylenediamine, triethylenetetramine, imidazole, 2-methylimidazole, 2-ethylimidazole, 1,2-dimethylimidazole, 2-ethyl-4-methylimidazole, 2-phenylimidazole, 2-phenyl-4-methylimidazole, 1-benzyl-2-methylimidazole, 1-benzyl-2-phenylimidazole, 1-cyanoethyl-2-methylimidazole, 1-cyanoethyl-2-undecylimidazole, 1-cyanoethyl-2-ethyl-4-methylimidazole, 1-cyanoethyl-2-phenylimidazole, 1-cyanoethyl-2-undecylimidazolium trimellitate, 1-cyanoethyl-2-phenylimidazolium trimellitate, 2,4-diamino-6-[2'-methylimidazolyl-(1')]ethyl-s-triazine, 2,4-diamino-6-[2'-undecylimidazolyl-(1')]-ethyl-s-triazine, 2,4-diamino-6-[2'-ethyl-4'-methylimidazolyl-(1')]-ethyl-s-triazine, 2,4-diamino-6-[2'-methylimidazolyl-(1')]-ethyl-s-triazine isocyanuric acid adduct, 2-phenylimidazole isocyanuric acid adduct, 2-phenyl-4,5-dihydroxymethylimidazole, 2-phenyl-4-methyl-5-hydroxymethylimidazole, 2,3-dihydro-1H-pyrrolo[1,2-a]benzimidazole, 1-dodecyl-2-methyl-3-benzylimidazolium chloride, 2-methylimidazoline, 2-phenylimidazoline, 2,4-diamino-6-vinyl-s-triazine, 2,4-diamino-6-vinyl-s-triazine isocyanuric acid adduct, 2,4-diamino-6-methacryloyloxyethyl-s-triazine, epoxy-imidazole adduct, 2-methylbenzimidazole, 2-octylbenzimidazole, 2-pentylbenzimidazole, 2-(1-ethylpentyl)benzimidazole, 2-nonylbenzimidazole, 2-(4-thiazolyl)benzimidazole, benzimidazole, 2-(2'-hydroxy-5'-methylphenyl)benzotriazole, 2-(2'-hydroxy-3'-tert-butyl-5'-methylphenyl)-5-chlorobenzotriazole, 2-(2'-hydroxy-3',5'-di-tert-amylphenyl)benzotriazole, 2-(2'-hydroxy-5'-tert-octylphenyl)benzotriazole, 2,2'-methylenebis[6-(2H-benzotriazol-2-yl)-4-tert-octylphenol], 6-(2-benzotriazolyl)-4-tert-octyl-6'-tert-butyl-4'-methyl-2, 2'-methylenebisphenol, 1,2,3-benzotriazole, 1-[N,N-bis(2-ethylhexyl)aminomethyl]benzotriazole, carboxybenzotriazole, 1-[N,N-bis(2-ethylhexyl)aminomethyl] methylbenzotriazole, 2,2'-[[(methyl-1H-benzotriazol-1-yl) methyl]imino]bisethanol, 1-(1',2'-dicarboxyethyl) benzotriazole, 1-(2,3-dicarboxypropyl)benzotriazole, 1-[(2-ethylhexylamino)methyl]benzotriazole, 2,6-bis[(1H-benzotriazol-1-yl)methyl]-4-methylphenol, 5-methylbenzotriazole and 5-phenyltetrazole are exemplified. Two or more of these amines may be used at the same time.

The content of the amine (in a case where two or more amines are used, the total content thereof) is 0 to 5 wt %. Similarly to the preferable upper limit of the content of the other organic acid, that of the content of the amine is changed as appropriate depending on the use or objective of the flux. For example, in a case where the reduction action of the flux is emphasized, this upper limit is 2.5 wt %. When a change of the flux over time needs to be suppressed, this upper limit is 1.0 wt %.

1-3-3. Organophosphorus Compound

As the organophosphorus compound, methyl acid phosphate, ethyl acid phosphate, isopropyl acid phosphate, monobutyl acid phosphate, butyl acid phosphate, dibutyl acid phosphate, butoxyethyl acid phosphate, 2-ethylhexyl acid phosphate, bis(2-ethylhexyl) phosphate, monoisodecyl acid phosphate, isodecyl acid phosphate, lauryl acid phosphate, isotridecyl acid phosphate, stearyl acid phosphate, oleyl acid phosphate, beef tallow phosphate, coconut oil phosphate, isostearyl acid phosphate, alkyl acid phosphate, tetracosyl acid phosphate, ethylene glycol acid phosphate, 2-hydroxyethyl methacrylate acid phosphate, dibutyl pyrophosphate acid phosphate, mono-2-ethylhexyl 2-ethylhexylphosphonate and alkyl (alkyl) phosphonate are exemplified. Two or more of these organophosphorus compounds may be used at the same time.

The content of the organophosphorus compound (in a case where two or more organophosphorus compounds are used, the total content thereof) is 0 to 3 wt %. The upper limit of this content may be 1 wt %.

1-3-4. Organosulfur Compound

As the organosulfur compound, organic sulfonic acids such as alkanesulfonic acid, alkanolsulfonic acid and aromatic sulfonic acid are exemplified. The organic sulfonic acids may be included in the above-described other organic acids. As the alkanesulfonic acid, methanesulfonic acid, ethanesulfonic acid, 1-propanesulfonic acid, 2-propanesulfonic acid, 1-butanesulfonic acid, 2-butanesulfonic acid, pentanesulfonic acid, hexanesulfonic acid, decanesulfonic acid and dodecane sulfonic acid are exemplified. As the alkanolsulfonic acid, 2-hydroxyethane-1-sulfonic acid, 2-hydroxypropane-1-sulfonic acid, 2-hydroxybutane-1-sulfonic acid, 2-hydroxypentane-1-sulfonic acid, 1-hydroxypropane-2-sulfonic acid, 3-hydroxypropane-1-sulfonic acid, 4-hydroxybutane-1-sulfonic acid, 2-hydroxyhexane-1-sulfonic acid, 2-hydroxydecane-1-sulfonic acid and 2-hydroxydodecane-1-sulfonic acid are exemplified. As the aromatic sulfonic acid, 1-naphthalenesulfonic acid, 2-naphthalenesulfonic acid, toluenesulfonic acid, xylenesulfonic acid, p-phenolsulfonic acid, cresolsulfonic acid, sulfosalicylic acid, nitrobenzenesulfonic acid, sulfobenzoic acid and diphenylamine-4-sulfonic acid are exemplified.

The content of the organosulfur compound (in a case where two or more organosulfur compounds are used, the total content thereof) is 0 to 3 wt %. The upper limit of this content may be 1.5 wt %.

1-3-5. Organohalogen Compound

As the organohalogen compound, organic bromo compounds such as trans-2,3-dibromo-1,4-butenediol, triallyl isocyanurate hexabromide, 1-bromo-2-butanol, 1-bromo-2-propanol, 3-bromo-1-propanol, 3-bromo-1,2-propanediol, 1,4-dibromo-2-butanol, 1,3-dibromo-2-propanol, 2,3-dibromo-1-propanol, 2,3-dibromo-1,4-butanediol, 2,3-dibromo-2-butene-1,4-diol, trans-2,3-dibromo-2-butene-1,4-diol, cis-2,3-dibromo-2-butene-1,4-diol, tetrabromophthalic acid, bromosuccinic acid and 2,2,2-tribromoethanol are exemplified. As the organohalogen compound, in addition, organic chloro compounds such as a chloroalkane, a chlorinated fatty acid ester, chlorendic acid and a chlorendic anhydride are exemplified. As the organohalogen compound, furthermore, a fluorsurfactant, a surfactant having a perfluoroalkyl group and an organic fluoro compound such as polytetrafluoroethylene are exemplified. Two or more of these organohalogen compounds may be used at the same time.

The content of the organohalogen compound (in a case where two or more organohalogen compounds are used, the total content thereof) is 0 to 5 wt %. The upper limit of this content may be 1 wt %.

1-3-6. Amine Hydrohalide

The amine hydrohalide is a compound obtained by reacting an amine and a hydrogen halide. As the amine hydrohalide, stearylamine hydrochloride, diethylaniline hydrochloride, diethanolamine hydrochloride, 2-ethylhexylamine hydrobromide, pyridine hydrobromide, isopropylamine hydrobromide, cyclohexylamine hydrobromide, diethylamine hydrobromide, monoethylamine hydrobromide, 1,3-diphenylguanidine hydrobromide, dimethylamine hydrobromide, dimethylamine hydrochloride, rosinamine hydrobromide, 2-ethylhexylamine hydrochloride, isopropylamine hydrochloride, cyclohexylamine hydrochloride, 2-pipecholine hydrobromide, 1,3-diphenylguanidine hydrochloride, dimethylbenzylamine hydrochloride, hydrazinehydrate hydrobromide, dimethylcyclohexylamine hydrochloride, trinonylamine hydrobromide, diethylaniline hydrobromide, 2-diethylaminoethanol hydrobromide, 2-diethylaminoethanol hydrochloride, ammonium chloride, diallylamine hydrochloride, diallylamine hydrobromide, monoethylamine hydrochloride, diethylamine hydrochloride, triethylamine hydrobromide, triethylamine hydrochloride, hydrazine monohydrochloride, hydrazine dihydrochloride, hydrazine monohydrobromide, hydrazine dihydrobromide, pyridine hydrochloride, aniline hydrobromide, butylamine hydrochloride, hexylamine hydrochloride, n-octylamine hydrochloride, dodecylamine hydrochloride, dimethylcyclohexylamine hydrobromide, ethylenediamine dihydrobromide, rosinamine hydrobromide, 2-phenylimidazole hydrobromide, 4-benzylpyridine hydrobromide, L-glutamine hydrochloride, N-methylmorpholine hydrochloride, betain hydrochloride, 2-pipecholine hydroiodide, cyclohexylamine hydroiodide, 1,3-diphenylguanidine hydrofluoride, diethylamine hydrofluoride, 2-ethylhexylamine hydrofluoride, cyclohexylamine hydrofluoride, ethylamine hydrofluoride, rosinamine hydrofluoride, cyclohexylamine tetrafluoroborate and dicyclohexylamine tetrafluoroborate are exemplified.

The content of the amine hydrohalide (in a case where two or more amine hydrohalides are used, the total content thereof) is 0 to 2 wt %. The upper limit of this content may be 0.5 wt %.

1-4. Resin Composition

The flux according to the embodiment may contain a resin composition. That is, the flux according to the embodiment contains a resin composition as an optional component. As the resin composition, natural rosin such as gum rosin, wood rosin and tall oil rosin and derivatives obtained from this natural rosin are exemplified. As the rosin derivatives, purified rosin, polymerized rosin, hydrogenated rosin, disproportionated rosin, hydrogenated disproportionated rosin, acid-modified rosin, phenol-modified rosin and α,β unsaturated carboxylic acid-modified products (for example, acrylated rosin, maleated rosin and fumarated rosin) are exemplified. As the rosin derivatives, in addition, purified products, hydrides, disproportionated products, esterified products and the like of the above-described polymerized rosin or α,β unsaturated carboxylic acid-modified products are exemplified. Two or more of these resin compositions may be used at the same time.

The content of the resin composition (in a case where two or more resin compositions are used, the total content thereof) is 0 to 5 wt %. The upper limit of this content may be 1 wt %.

1-5. Solvent

The flux according to the embodiment may contain a solvent. That is, the flux according to the embodiment contains a solvent as an optional component. In order to efficiently cause the reduction actions of the activator and the co-activator, the solvent preferably does not volatilize at lower than 70° C. When the solvent volatilizes, the flux dries, and it becomes difficult for the flux to wet and spread over a soldering portion. Therefore, the boiling point of the solvent is preferably 200° C. or higher. However, the solvent needs to volatilize during heating. Therefore, the boiling point of the solvent is preferably 280° C. or lower.

As the solvent, water, an alcohol solvent, a glycol ether solvent and terpineols are exemplified. As the alcohol solvent, isopropyl alcohol, 1,2-butanediol, isobornyl cyclohexanol, 2,4-diethyl-1,5-pentanediol, 2,2-dimethyl-1,3-propanediol, 2,5-dimethyl-2,5-hexanediol, 2,5-dimethyl-3-hexyne-2,5-diol, 2,3-dimethyl-2,3-butanediol, 1,1,1-tris(hydroxymethyl)ethane, 2-ethyl-2-hydroxymethyl-1,3-propanediol, 2,2'-oxybis(methylene) bis(2-ethyl-1,3-propanediol), 2,2-bis(hydroxymethyl)-1,3-propanediol, 1,2,6-trihydroxyhexane, bis[2,2,2-tris(hydroxymethyl)ethyl] ether, 1-ethynyl-1-cyclohexanole, 1,4-cyclohexanediol, 1,4-cyclohexanedimethanol, erythritol, threitol, guaiacol glycerol ether, 3,6-dimethyl-4-octyne-3,6-diol and 2,4,7,9-tetramethyl-5-decyne-4,7-diol are exemplified. As the glycol ether solvent, hexyl diglycol, diethylene glycol mono-2-ethylhexyl ether, ethylene glycol monophenyl ether, 2-methylpentane-2,4-diol, diethylene glycol monohexyl ether, diethylene glycol dibutyl ether and triethylene glycol monobutyl ether are exemplified. As the solvent, one of the above-described solvents may be used or two or more solvents may be used at the same time.

The content of the solvent (in a case where two or more solvents are used, the total content thereof) is 0 to 76 wt %. The upper limit of this content may be 65 wt %, may be 30 wt %, may be 20.5 wt %, may be 15.5 wt % or may be 12 wt %.

1-6. Other Additives

The flux according to the embodiment may contain, as other additives, an antioxidant, a defoamer and a colorant. As the antioxidant, a hindered phenolic antioxidant is exemplified. As the defoamer, an acrylic polymer, a vinyl ether polymer, a butadiene polymer and silicone are exemplified. As the other additive, one of the above-described additives may be used or two or more additives may be used at the same time. The content of the other additive (in a case where two or more other additives are used, the total content thereof) is 0 to 5 wt %.

2. Solder Paste

A solder paste according to an embodiment contains the above-described flux and a solder powder.

The composition of the solder powder that is used in the solder paste is not particularly limited, and pure Sn and a variety of solder alloys can be used as the solder powder. As the variety of solder alloys, two-component alloys and multi-component alloys including three or more-component alloys are exemplified. As the two-component alloys, a Sn—Sb-based alloy, a Sn—Pb-based alloy, a Sn—Cu-based alloy, a Sn—Ag-based alloy, a Sn—Bi-based alloy and a Sn—In-based alloy are exemplified. As the multicomponent alloys, alloys obtained by adding one or more metals selected from the group consisting of Sb, Bi, In, Cu, Zn, As, Ag, Cd, Fe, Ni, Co, Au, Ge and P to the above-described two-component alloy are exemplified.

The contents of the solder powder and the flux relative to the mass of the entire solder paste are not limited. For example, the content of the solder powder is 5 to 95 mass %, and that of the flux is 5 to 95 mass %.

A method for producing the solder paste is not limited, and the solder paste is produced by mixing the raw materials at the same time or in order by any method. In the production of the solder paste, all of the components of the flux and the solder powder need to be mixed in the end. That is, the solder powder may be mixed with all of the components of the flux that have been prepared in advance, or some of the components of the flux may be mixed with the solder powder and then the remaining components of the flux may be further mixed therein. Furthermore, all of the components of the solder paste may be mixed at the same time.

3. Examples

Hereinafter, the flux according to the embodiment will be described in detail based on examples.

Fluxes of the examples and comparative examples were prepared according to blending proportions shown in Tables 1 to 20 below. Next, each of the fluxes and a solder powder having a composition of Sn-3.0Ag-0.5Cu (SAC305) were mixed together in a mass ratio of flux:solder powder=11:89, thereby preparing a solder paste. As the solder powder, a solder powder that is classified into a reference sign "6" in Table 2 (classification of powder sizes) of JIS Z 3284-1: 2014 was used. Next, the solder paste was printed on a Cu-OSP electrode (N=6) in a height of 80 μm using a metal mask.

After that, a quad flat non-lead package (QFN) was placed thereon, and reflow was performed. As the QFN, a component that was a square in which the length of each side was 4 mm and had a lower surface electrode that was a square in which the length of each side was 1.7 mm was used. The reflow was performed in a $N_2$ atmosphere, and the profile was that the QFN was held at 140° C. to 170° C. for 71 seconds, then, the temperature was raised up to 244° C. and the QFN was heated at 220° C. or higher for 58 seconds.

After the reflow, a transparent image of a solder joint portion was observed using an X-ray fluoroscopy device (Microfocus X-ray System XVR-160 manufactured by UNI-HITE SYSTEM Corporation), and the void generation percentage was obtained. Specifically, transmission observation was performed from the upper portion toward the lower portion of the solder joint portion to obtain the transparent image of the solder joint portion. In addition, the void area percentage was calculated by automatic analysis, by which metal-filled portions and void portions (non-metal-filled portions) were identified based on the tonal contrast of the transparent image, and this was regarded as the void generation percentage. The evaluation criteria of the property of suppressing the generation of voids are as described below.

o: The average value of the void generation percentages at six solder joint portions is 15% or less.

X: The average value of the void generation percentages at six solder joint portions is more than 15%.

TABLE 1

| | Material | CAS No. | Ex.1 | Ex.2 | Ex.3 | Ex.4 |
|---|---|---|---|---|---|---|
| Specific activator | HBA | 594-61-6 | 3 | 1 | 5 | 10 |
| Cationic surfactant | Polyoxypropylene ethylene diamine | 25214-63-5 | 22 | 22 | 22 | 22 |
| | Polyethylene polypropylene bisaminopropyl ether | 65605-36-9 | 17 | 17 | 17 | 17 |
| | Oleylamine-EO adduct | 26635-93-8 | 7 | 7 | 7 | 7 |
| Nonionic surfactant | PEG2000 | 25322-68-3 | | | | |
| | PEG4000 | 25322-68-3 | 15 | 15 | 15 | 15 |
| | Cetyl alcohol EO adduct | 9004-95-9 | | | | |
| | Behenyl alcohol EO adduct | 71011-10-4 OR 26636-40-8 & 26636-39-5 | | | | |

TABLE 1-continued

| Material | | CAS No. | Ex.1 | Ex.2 | Ex.3 | Ex.4 |
|---|---|---|---|---|---|---|
| | Resorcinol EO adduct | 70356-25-1 | | | | |
| | Sorbitan monolaurate | 1338-39-2 | 3 | 3 | 3 | 3 |
| Organic acid | Succinic acid | 110-15-6 | 0.5 | 0.5 | 0.5 | 0.5 |
| | Glutaric acid | 110-94-1 | | | | |
| | Malic acid | 6915-15-7 | | | | |
| | Diglycolic acid | 110-99-6 | 1.5 | 1.5 | 1.5 | 1.5 |
| | 2,2-Bis(hydroxymethyl) propionic acid | 4767-03-7 | | | | |
| Amine activator | Imidazole | 288-32-4 | | | | |
| | 2-Ethylimidazole | 1072-62-4 | | | | |
| | 2-Methylimidazole | 693-98-1 | 0.5 | 0.5 | 0.5 | 0.5 |
| | Triethylenetetramine | 112-24-3 | 0.5 | 0.5 | 0.5 | 0.5 |
| | Triethylamine | 121-44-8 | | | | |
| Organophosphorus compound activator | Mono-2-ethylhexyl 2-ethylhexylphosphonate | 14802-03-0 | | | | |
| Organosulfur compound activator | Methanesulfonic acid | 75-75-2 | | | | |
| Organohalogen compound | 2,3-Dibromo-1,4-butanediol | 20163-90-0 | | | | |
| Amine hydrohalide | Ethylamine-Hbr salt | 593-55-5 | | | | |
| Resin composition | Hydrogenated rosin | 65997-06-0 | | | | |
| Solvent | HeDG | 112-59-4 | 30 | 32 | 28 | 23 |
| | α-Terpineol | 98-55-5 | | | | |
| | Total | | 100 | 100 | 100 | 100 |
| | Void generation percentage | | ○ | ○ | ○ | ○ |

TABLE 2

| Material | | CAS No. | Ex.5 | Ex.6 | Ex.7 | Ex.8 |
|---|---|---|---|---|---|---|
| Specific activator | HBA | 594-61-6 | 3 | 1 | 5 | 10 |
| Cationic surfactant | Polyoxypropylene ethylene diamine | 25214-63-5 | 12 | 12 | 12 | 12 |
| | Polyethylene polypropylene bisaminopropyl ether | 65605-36-9 | 20 | 20 | 20 | 20 |
| | Oleylamine-EO adduct | 26635-93-8 | | | | |
| Nonionic surfactant | PEG2000 | 25322-68-3 | | | | |
| | PEG4000 | 25322-68-3 | 10 | 10 | 10 | 10 |
| | Cetyl alcohol EO adduct | 9004-95-9 | | | | |
| | Behenyl alcohol EO adduct | 71011-10-4 OR 26636-40-8 & 26636-39-5 | | | | |
| | Resorcinol EO adduct | 70356-25-1 | 35 | 35 | 35 | 35 |
| | Sorbitan monolaurate | 1338-39-2 | | | | |
| Organic acid | Succinic acid | 110-15-6 | 0.5 | 0.5 | 0.5 | 0.5 |
| | Glutaric acid | 110-94-1 | | | | |
| | Malic acid | 6915-15-7 | | | | |
| | Diglycolic acid | 110-99-6 | | | | |
| | 2,2-Bis(hydroxymethyl) propionic acid | 4767-03-7 | | | | |
| Amine activator | Imidazole | 288-32-4 | | | | |
| | 2-Ethylimidazole | 1072-62-4 | 2 | 2 | 2 | 2 |
| | 2-Methylimidazole | 693-98-1 | | | | |
| | Triethylenetetramine | 112-24-3 | 0.5 | 0.5 | 0.5 | 0.5 |
| | Triethylamine | 121-44-8 | | | | |
| Organophosphorus compound activator | Mono-2-ethylhexyl 2-ethylhexylphosphonate | 14802-03-0 | | | | |
| Organosulfur compound activator | Methanesulfonic acid | 75-75-2 | 1.5 | 1.5 | 1.5 | 1.5 |

TABLE 2-continued

| Material | | CAS No. | Ex.5 | Ex.6 | Ex.7 | Ex.8 |
|---|---|---|---|---|---|---|
| Organohalogen compound | 2,3-Dibromo-1,4-butanediol | 20163-90-0 | | | | |
| Amine hydrohalide | Ethylamine-Hbr salt | 593-55-5 | | | | |
| Resin composition | Hydrogenated rosin | 65997-06-0 | | | | |
| Solvent | HeDG | 112-59-4 | | | | |
| | α-Terpineol | 98-55-5 | 15.5 | 17.5 | 13.5 | 8.5 |
| | Total | | 100 | 100 | 100 | 100 |
| | Void generation percentage | | ○ | ○ | ○ | ○ |

TABLE 3

| Material | | CAS No. | C-Ex.1 | C-Ex.2 | Ex.9 | Ex.10 |
|---|---|---|---|---|---|---|
| Specific activator | HBA | 594-61-6 | | | 3 | 3 |
| Cationic surfactant | Polyoxypropylene ethylene diamine | 25214-63-5 | 22 | 12 | 46 | |
| | Polyethylene polypropylene bisaminopropyl ether | 65605-36-9 | 17 | 20 | | 46 |
| | Oleylamine-EO adduct | 26635-93-8 | 7 | | | |
| Nonionic surfactant | PEG2000 | 25322-68-3 | | | | |
| | PEG4000 | 25322-68-3 | 15 | 10 | 15 | 15 |
| | Cetyl alcohol EO adduct | 9004-95-9 | | | | |
| | Behenyl alcohol EO adduct | 71011-10-4 OR 26636-40-8 & 26636-39-5 | | | | |
| | Resorcinol EO adduct | 70356-25-1 | | 35 | | |
| | Sorbitan monolaurate | 1338-39-2 | 3 | | 3 | 3 |
| Organic acid | Succinic acid | 110-15-6 | 0.5 | 0.5 | 0.5 | 0.5 |
| | Glutaric acid | 110-94-1 | | | | |
| | Malic acid | 6915-15-7 | | | | |
| | Diglycolic acid | 110-99-6 | 1.5 | | 1.5 | 1.5 |
| | 2,2-Bis(hydroxymethyl) propionic acid | 4767-03-7 | | | | |
| Amine activator | Imidazole | 288-32-4 | | | | |
| | 2-Ethylimidazole | 1072-62-4 | | 2 | | |
| | 2-Methylimidazole | 693-98-1 | 0.5 | | 0.5 | 0.5 |
| | Triethylenetetramine | 112-24-3 | 0.5 | 0.5 | 0.5 | 0.5 |
| | Triethylamine | 121-44-8 | | | | |
| Organophosphorus compound activator | Mono-2-ethylhexyl 2-ethylhexylphosphonate | 14802-03-0 | | | | |
| Organosulfur compound activator | Methanesulfonic acid | 75-75-2 | | 1.5 | | |
| Organohalogen compound | 2,3-Dibromo-1,4-butanediol | 20163-90-0 | | | | |
| Amine hydrohalide | Ethylamine-Hbr salt | 593-55-5 | | | | |
| Resin composition | Hydrogenated rosin | 65997-06-0 | | | | |
| Solvent | HeDG | 112-59-4 | 33 | | 30 | 30 |
| | α-Terpineol | 98-55-5 | | 18.5 | | |
| | Total | | 100 | 100 | 100 | 100 |
| | Void generation percentage | | x | x | ○ | ○ |

TABLE 4

| Material | | CAS No. | Ex.11 | Ex.12 | Ex.13 | Ex.14 |
|---|---|---|---|---|---|---|
| Specific activator | HBA | 594-61-6 | 3 | 3 | 3 | 3 |
| Cationic surfactant | Polyoxypropylene ethylene diamine | 25214-63-5 | | 32 | | |

TABLE 4-continued

| Material | | CAS No. | Ex.11 | Ex.12 | Ex.13 | Ex.14 |
|---|---|---|---|---|---|---|
| | Polyethylene polypropylene bisaminopropyl ether | 65605-36-9 | | | 32 | |
| | Oleylamine-EO adduct | 26635-93-8 | 46 | | | 32 |
| Nonionic surfactant | PEG2000 | 25322-68-3 | | | | |
| | PEG4000 | 25322-68-3 | 15 | 10 | 10 | 10 |
| | Cetyl alcohol EO adduct | 9004-95-9 | | | | |
| | Behenyl alcohol EO adduct | 71011-10-4 OR 26636-40-8 & 26636-39-5 | | | | |
| | Resorcinol EO adduct | 70356-25-1 | | 35 | 35 | 35 |
| | Sorbitan monolaurate | 1338-39-2 | 3 | | | |
| Organic acid | Succinic acid | 110-15-6 | 0.5 | 0.5 | 0.5 | 0.5 |
| | Glutaric acid | 110-94-1 | | | | |
| | Malic acid | 6915-15-7 | | | | |
| | Diglycolic acid | 110-99-6 | 1.5 | | | |
| | 2,2-Bis(hydroxymethyl) propionic acid | 4767-03-7 | | | | |
| Amine activator | Imidazole | 288-32-4 | | | | |
| | 2-Ethylimidazole | 1072-62-4 | | 2 | 2 | 2 |
| | 2-Methylimidazole | 693-98-1 | 0.5 | | | |
| | Triethylenetetramine | 112-24-3 | 0.5 | 0.5 | 0.5 | 0.5 |
| | Triethylamine | 121-44-8 | | | | |
| Organophosphorus compound activator | Mono-2-ethylhexyl 2-ethylhexylphosphonate | 14802-03-0 | | | | |
| Organosulfur compound activator | Methanesulfonic acid | 75-75-2 | | 1.5 | 1.5 | 1.5 |
| Organohalogen compound | 2,3-Dibromo-1,4-butanediol | 20163-90-0 | | | | |
| Amine hydrohalide | Ethylamine-Hbr salt | 593-55-5 | | | | |
| Resin composition | Hydrogenated rosin | 65997-06-0 | | | | |
| Solvent | HeDG | 112-59-4 | 30 | | | |
| | α-Terpineol | 98-55-5 | | 15.5 | 15.5 | 15.5 |
| | Total | | 100 | 100 | 100 | 100 |
| | Void generation percentage | | ○ | ○ | ○ | ○ |

TABLE 5

| Material | | CAS No. | Ex.15 | Ex.16 | Ex.17 | Ex.18 |
|---|---|---|---|---|---|---|
| Specific activator | HBA | 594-61-6 | 3 | 3 | 3 | 3 |
| Cationic surfactant | Polyoxypropylene ethylene diamine | 25214-63-5 | 10 | 20 | 20 | 10 |
| | Polyethylene polypropylene bisaminopropyl ether | 65605-36-9 | | | 10 | |
| | Oleylamine-EO adduct | 26635-93-8 | | | | |
| Nonionic surfactant | PEG2000 | 25322-68-3 | | | | |
| | PEG4000 | 25322-68-3 | 15 | 15 | 15 | 10 |
| | Cetyl alcohol EO adduct | 9004-95-9 | | | | |
| | Behenyl alcohol EO adduct | 71011-10-4 OR 26636-40-8 & 26636-39-5 | | | | |
| | Resorcinol EO adduct | 70356-25-1 | 36 | 26 | 16 | 35 |
| | Sorbitan monolaurate | 1338-39-2 | 3 | 3 | 3 | |
| Organic acid | Succinic acid | 110-15-6 | 0.5 | 0.5 | 0.5 | 0.5 |
| | Glutaric acid | 110-94-1 | | | | |
| | Malic acid | 6915-15-7 | | | | |
| | Diglycolic acid | 110-99-6 | 1.5 | 1.5 | 1.5 | |

TABLE 5-continued

| | Material | CAS No. | Ex.15 | Ex.16 | Ex.17 | Ex.18 |
|---|---|---|---|---|---|---|
| | 2,2-Bis(hydroxymethyl) propionic acid | 4767-03-7 | | | | |
| Amine activator | Imidazole | 288-32-4 | | | | |
| | 2-Ethylimidazole | 1072-62-4 | | | | 2 |
| | 2-Methylimidazole | 693-98-1 | 0.5 | 0.5 | 0.5 | |
| | Triethylenetetramine | 112-24-3 | 0.5 | 0.5 | 0.5 | 0.5 |
| | Triethylamine | 121-44-8 | | | | |
| Organophosphorus compound activator | Mono-2-ethylhexyl 2-ethylhexylphosphonate | 14802-03-0 | | | | |
| Organosulfur compound activator | Methanesulfonic acid | 75-75-2 | | | | 1.5 |
| Organohalogen compound | 2,3-Dibromo-1,4-butanediol | 20163-90-0 | | | | |
| Amine hydrohalide | Ethylamine-Hbr salt | 593-55-5 | | | | |
| Resin composition | Hydrogenated rosin | 65997-06-0 | | | | |
| Solvent | HeDG | 112-59-4 | 30 | 30 | 30 | |
| | α-Terpineol | 98-55-5 | | | | 37.5 |
| | Total | | 100 | 100 | 100 | 100 |
| | Void generation percentage | | ○ | ○ | ○ | ○ |

TABLE 6

| | Material | CAS No. | Ex. 19 | Ex. 20 | Ex. 21 | Ex. 22 |
|---|---|---|---|---|---|---|
| Specific activator | HBA | 594-61-6 | 3 | 3 | 3 | 3 |
| Cationic surfactant | Polyoxypropylene ethylene diamine | 25214-63-5 | 20 | 20 | 22 | 22 |
| | Polyethylene polypropylene bisaminopropyl ether | 65605-36-9 | | 10 | 17 | 17 |
| | Oleylamine-EO adduct | 26635-93-8 | | | 7 | 7 |
| Nonionic surfactant | PEG2000 | 25322-68-3 | | | 18 | |
| | PEG4000 | 25322-68-3 | 10 | 10 | | 18 |
| | Cetyl alcohol EO adduct | 9004-95-9 | | | | |
| | Behenyl alcohol EO adduct | 71011-10-4 OR 26636-40-8 & 26636-39-5 | | | | |
| | Resorcinol EO adduct | 70356-25-1 | 35 | 35 | | |
| | Sorbitan monolaurate | 1338-39-2 | | | | |
| Organic acid | Succinic acid | 110-15-6 | 0.5 | 0.5 | 0.5 | 0.5 |
| | Glutaric acid | 110-94-1 | | | | |
| | Malic acid | 6915-15-7 | | | | |
| | Diglycolic acid | 110-99-6 | | | 1.5 | 1.5 |
| | 2,2-Bis(hydroxymethyl) propionic acid | 4767-03-7 | | | | |
| Amine activator | Imidazole | 288-32-4 | | | | |
| | 2-Ethylimidazole | 1072-62-4 | 2 | 2 | | |
| | 2-Methylimidazole | 693-98-1 | | | 0.5 | 0.5 |
| | Triethylenetetramine | 112-24-3 | 0.5 | 0.5 | 0.5 | 0.5 |
| | Triethylamine | 121-44-8 | | | | |
| Organophosphorus compound activator | Mono-2-ethylhexyl 2-ethylhexylphosphonate | 14802-03-0 | | | | |
| Organosulfur compound activator | Methanesulfonic acid | 75-75-2 | 1.5 | 1.5 | | |
| Organohalogen compound | 2,3-Dibromo-1,4-butanediol | 20163-90-0 | | | | |
| Amine hydrohalide | Ethylamine-HBr salt | 593-55-5 | | | | |
| Resin composition | Hydrogenated rosin | 65997-06-0 | | | | |
| Solvent | HeDG | 112-59-4 | | | 30 | 30 |
| | α-Terpineol | 98-55-5 | 27.5 | 17.5 | | |
| | Total | | 100 | 100 | 100 | 100 |
| | Void generation percentage | | ○ | ○ | ○ | ○ |

TABLE 7

| | Material | CAS No. | Ex. 23 | Ex. 24 | Ex. 25 | Ex. 26 |
|---|---|---|---|---|---|---|
| Specific activator | HBA | 594-61-6 | 3 | 3 | 3 | 3 |
| Cationic surfactant | Polyoxypropylene ethylene diamine | 25214-63-5 | 22 | 22 | 12 | 12 |

TABLE 7-continued

| | Material | CAS No. | Ex. 23 | Ex. 24 | Ex. 25 | Ex. 26 |
|---|---|---|---|---|---|---|
| | Polyethylene polypropylene bisaminopropyl ether | 65605-36-9 | 17 | 17 | 20 | 20 |
| | Oleylamine-EO adduct | 26635-93-8 | 7 | 7 | | |
| Nonionic surfactant | PEG2000 | 25322-68-3 | | | 10 | |
| | PEG4000 | 25322-68-3 | | | | |
| | Cetyl alcohol EO adduct | 9004-95-9 | 18 | | | 10 |
| | Behenyl alcohol EO adduct | 71011-10-4 OR 26636-40-8 & 26636-39-5 | | 18 | | |
| | Resorcinol EO adduct | 70356-25-1 | | | 35 | 35 |
| | Sorbitan monolaurate | 1338-39-2 | | | | |
| Organic acid | Succinic acid | 110-15-6 | 0.5 | 0.5 | 0.5 | 0.5 |
| | Glutaric acid | 110-94-1 | | | | |
| | Malic acid | 6915-15-7 | | | | |
| | Diglycolic acid | 110-99-6 | 1.5 | 1.5 | | |
| | 2,2-Bis(hydroxymethyl) propionic acid | 4767-03-7 | | | | |
| Amine activator | Imidazole | 288-32-4 | | | | |
| | 2-Ethylimidazole | 1072-62-4 | | | 2 | 2 |
| | 2-Methylimidazole | 693-98-1 | 0.5 | 0.5 | | |
| | Triethylenetetramine | 112-24-3 | 0.5 | 0.5 | 0.5 | 0.5 |
| | Triethylamine | 121-44-8 | | | | |
| Organophosphorus compound activator | Mono-2-ethylhexyl 2-ethylhexylphosphonate | 14802-03-0 | | | | |
| Organosulfur compound activator | Methanesulfonic acid | 75-75-2 | | | 1.5 | 1.5 |
| Organohalogen compound | 2,3-Dibromo-1,4-butanediol | 20163-90-0 | | | | |
| Amine hydrohalide | Ethylamine-HBr salt | 593-55-5 | | | | |
| Resin composition | Hydrogenated rosin | 65997-06-0 | | | | |
| Solvent | HeDG | 112-59-4 | 30 | 30 | | |
| | α-Terpineol | 98-55-5 | | | 15.5 | 15.5 |
| | Total | | 100 | 100 | 100 | 100 |
| | Void generation percentage | | ○ | ○ | ○ | ○ |

TABLE 8

| | Material | CAS No. | Ex. 27 | Ex. 28 | Ex. 29 | Ex. 30 | Ex. 31 |
|---|---|---|---|---|---|---|---|
| Specific activator | HBA | 594-61-6 | 3 | 3 | 3 | 3 | 3 |
| Cationic surfactant | Polyoxypropylene ethylene diamine | 25214-63-5 | 12 | 22 | 22 | 12 | 12 |
| | Polyethylene polypropylene bisaminopropyl ether | 65605-36-9 | 20 | 17 | 17 | 20 | 20 |
| | Oleylamine-EO adduct | 26635-93-8 | | 7 | 7 | | |
| Nonionic surfactant | PEG2000 | 25322-68-3 | | | | | |
| | PEG4000 | 25322-68-3 | | 5 | 5 | 15 | 15 |
| | Cetyl alcohol EO adduct | 9004-95-9 | | | | | |
| | Behenyl alcohol EO adduct | 71011-10-4 OR 26636-40-8 & 26636-39-5 | 10 | | | | |
| | Resorcinol EO adduct | 70356-25-1 | 35 | | | 35 | 45 |
| | Sorbitan monolaurate | 1338-39-2 | | | 5 | | |
| Organic acid | Succinic acid | 110-15-6 | 0.5 | 0.5 | 0.5 | 0.5 | 0.5 |
| | Glutaric acid | 110-94-1 | | | | | |
| | Malic acid | 6915-15-7 | | | | | |
| | Diglycolic acid | 110-99-6 | | 1.5 | 1.5 | | |
| | 2,2-Bis(hydroxymethyl) propionic acid | 4767-03-7 | | | | | |
| Amine activator | Imidazole | 288-32-4 | | | | | |
| | 2-Ethylimidazole | 1072-62-4 | 2 | | | 2 | 2 |
| | 2-Methylimidazole | 693-98-1 | | 0.5 | 0.5 | | |
| | Triethylenetetramine | 112-24-3 | 0.5 | 0.5 | 0.5 | 0.5 | 0.5 |
| | Triethylamine | 121-44-8 | | | | | |
| Organophosphorus compound activator | Mono-2-ethylhexyl 2-ethylhexylphosphonate | 14802-03-0 | | | | | |
| Organosulfur compound activator | Methanesulfonic acid | 75-75-2 | 1.5 | | | 1.5 | 1.5 |
| Organohalogen compound | 2,3-Dibromo-1,4-butanediol | 20163-90-0 | | | | | |
| Amine hydrohalide | Ethylamine-HBr salt | 593-55-5 | | | | | |
| Resin composition | Hydrogenated rosin | 65997-06-0 | | | | | |
| Solvent | HeDG | 112-59-4 | | 43 | 38 | | |

TABLE 8-continued

| Material | CAS No. | Ex. 27 | Ex. 28 | Ex. 29 | Ex. 30 | Ex. 31 |
|---|---|---|---|---|---|---|
| α-Terpineol | 98-55-5 | 15.5 | | | 10.5 | 0.5 |
| Total | | 100 | 100 | 100 | 100 | 100 |
| Void generation percentage | | ○ | ○ | ○ | ○ | ○ |

TABLE 9

| | Material | CAS No. | Ex. 32 | Ex. 33 | Ex. 34 | Ex. 35 |
|---|---|---|---|---|---|---|
| Specific activator | HBA | 594-61-6 | 3 | 3 | 5 | 3.5 |
| Cationic surfactant | Polyoxypropylene ethylene diamine | 25214-63-5 | 22 | 12 | 22 | 12 |
| | Polyethylene polypropylene bisaminopropyl ether | 65605-36-9 | 17 | 20 | 17 | 20 |
| | Oleylamine-EO adduct | 26635-93-8 | 7 | | 7 | |
| Nonionic surfactant | PEG2000 | 25322-68-3 | 3 | 3 | | |
| | PEG4000 | 25322-68-3 | 3 | 3 | 15 | 10 |
| | Cetyl alcohol EO adduct | 9004-95-9 | 3 | 3 | | |
| | Behenyl alcohol EO adduct | 71011-10-4 OR 26636-40-8 & 26636-39-5 | 3 | 3 | | |
| | Resorcinol EO adduct | 70356-25-1 | 3 | 30 | | 35 |
| | Sorbitan monolaurate | 1338-39-2 | 3 | 3 | 3 | |
| Organic acid | Succinic acid | 110-15-6 | 0.5 | 0.5 | | |
| | Glutaric acid | 110-94-1 | | | | |
| | Malic acid | 6915-15-7 | | | | |
| | Diglycolic acid | 110-99-6 | 1.5 | | | |
| | 2,2-Bis(hydroxymethyl) propionic acid | 4767-03-7 | | | | |
| Amine activator | Imidazole | 288-32-4 | | | | |
| | 2-Ethylimidazole | 1072-62-4 | | 2 | | 2 |
| | 2-Methylimidazole | 693-98-1 | 0.5 | | 0.5 | |
| | Triethylenetetramine | 112-24-3 | 0.5 | 0.5 | 0.5 | 0.5 |
| | Triethylamine | 121-44-8 | | | | |
| Organophosphorus compound activator | Mono-2-ethylhexyl 2-ethylhexylphosphonate | 14802-03-0 | | | | |
| Organosulfur compound activator | Methanesulfonic acid | 75-75-2 | | 1.5 | | 1.5 |
| Organohalogen compound | 2,3-Dibromo-1,4-butanediol | 20163-90-0 | | | | |
| Amine hydrohalide | Ethylamine-HBr salt | 593-55-5 | | | | |
| Resin composition | Hydrogenated rosin | 65997-06-0 | | | | |
| Solvent | HeDG | 112-59-4 | 30 | | 30 | |
| | α-Terpineol | 98-55-5 | | 15.5 | | 15.5 |
| Total | | | 100 | 100 | 100 | 100 |
| Void generation percentage | | | ○ | ○ | ○ | ○ |

TABLE 10

| | Material | CAS No. | Ex. 36 | Ex. 37 | Ex. 38 | Ex. 39 |
|---|---|---|---|---|---|---|
| Specific activator | HBA | 594-61-6 | 3 | 3 | 3 | 3 |
| Cationic surfactant | Polyoxypropylene ethylene diamine | 25214-63-5 | 22 | 12 | 22 | 22 |
| | Polyethylene polypropylene bisaminopropyl ether | 65605-36-9 | 17 | 20 | 17 | 17 |
| | Oleylamine-EO adduct | 26635-93-8 | 7 | | 7 | 7 |
| Nonionic surfactant | PEG2000 | 25322-68-3 | | | | |
| | PEG4000 | 25322-68-3 | 15 | 10 | 15 | 15 |
| | Cetyl alcohol EO adduct | 9004-95-9 | | | | |
| | Behenyl alcohol EO adduct | 71011-10-4 OR 26636-40-8 & 26636-39-5 | | | | |
| | Resorcinol EO adduct | 70356-25-1 | | 20 | | |
| | Sorbitan monolaurate | 1338-39-2 | 3 | | 3 | 3 |
| Organic acid | Succinic acid | 110-15-6 | | | 2 | |
| | Glutaric acid | 110-94-1 | | | | 2 |
| | Malic acid | 6915-15-7 | | | | |
| | Diglycolic acid | 110-99-6 | | | | |
| | 2,2-Bis(hydroxymethyl) propionic acid | 4767-03-7 | 10 | 10 | | |

TABLE 10-continued

| Material | | CAS No. | Ex. 36 | Ex. 37 | Ex. 38 | Ex. 39 |
| --- | --- | --- | --- | --- | --- | --- |
| Amine activator | Imidazole | 288-32-4 | | | | |
| | 2-Ethylimidazole | 1072-62-4 | | 2 | | |
| | 2-Methylimidazole | 693-98-1 | 0.5 | | 0.5 | 0.5 |
| | Triethylenetetramine | 112-24-3 | 0.5 | 0.5 | 0.5 | 0.5 |
| | Triethylamine | 121-44-8 | | | | |
| Organophosphorus compound activator | Mono-2-ethylhexyl 2-ethylhexylphosphonate | 14802-03-0 | | | | |
| Organosulfur compound activator | Methanesulfonic acid | 75-75-2 | | 1.5 | | |
| Organohalogen compound | 2,3-Dibromo-1,4-butanediol | 20163-90-0 | | | | |
| Amine hydrohalide | Ethylamine-HBr salt | 593-55-5 | | | | |
| Resin composition | Hydrogenated rosin | 65997-06-0 | | | | |
| Solvent | HeDG | 112-59-4 | 22 | | 30 | 30 |
| | α-Terpineol | 98-55-5 | | 21 | | |
| | Total | | 100 | 100 | 100 | 100 |
| | Void generation percentage | | ○ | ○ | ○ | ○ |

TABLE 11

| Material | | CAS No. | Ex. 40 | Ex. 41 | Ex. 42 | Ex. 43 |
| --- | --- | --- | --- | --- | --- | --- |
| Specific activator | HBA | 594-61-6 | 3 | 3 | 3 | 3 |
| Cationic surfactant | Polyoxypropylene ethylene diamine | 25214-63-5 | 22 | 22 | 22 | 12 |
| | Polyethylene polypropylene bisaminopropyl ether | 65605-36-9 | 17 | 17 | 17 | 20 |
| | Oleylamine-EO adduct | 26635-93-8 | 7 | 7 | 7 | |
| Nonionic surfactant | PEG2000 | 25322-68-3 | | | | |
| | PEG4000 | 25322-68-3 | 15 | 15 | 15 | 10 |
| | Cetyl alcohol EO adduct | 9004-95-9 | | | | |
| | Behenyl alcohol EO adduct | 71011-10-4 OR 26636-40-8 & 26636-39-5 | | | | |
| | Resorcinol EO adduct | 70356-25-1 | | | | 35 |
| | Sorbitan monolaurate | 1338-39-2 | 3 | 3 | 3 | |
| Organic acid | Succinic acid | 110-15-6 | | | | 0.5 |
| | Glutaric acid | 110-94-1 | | | | |
| | Malic acid | 6915-15-7 | 2 | | | |
| | Diglycolic acid | 110-99-6 | | 2 | | |
| | 2,2-Bis(hydroxymethyl) propionic acid | 4767-03-7 | | | 2 | |
| Amine activator | Imidazole | 288-32-4 | | | | |
| | 2-Ethylimidazole | 1072-62-4 | | | | 2 |
| | 2-Methylimidazole | 693-98-1 | 0.5 | 0.5 | 0.5 | |
| | Triethylenetetramine | 112-24-3 | 0.5 | 0.5 | 0.5 | 0.5 |
| | Triethylamine | 121-44-8 | | | | |
| Organophosphorus compound activator | Mono-2-ethylhexyl 2-ethylhexylphosphonate | 14802-03-0 | | | | |
| Organosulfur compound activator | Methanesulfonic acid | 75-75-2 | | | | 1.5 |
| Organohalogen compound | 2,3-Dibromo-1,4-butanediol | 20163-90-0 | | | | |
| Amine hydrohalide | Ethylamine-HBr salt | 593-55-5 | | | | |
| Resin composition | Hydrogenated rosin | 65997-06-0 | | | | |
| Solvent | HeDG | 112-59-4 | 30 | 30 | 30 | |
| | α-Terpineol | 98-55-5 | | | | 15.5 |
| | Total | | 100 | 100 | 100 | 100 |
| | Void generation percentage | | ○ | ○ | ○ | ○ |

TABLE 12

| Material | | CAS No. | Ex. 44 | Ex. 45 | Ex. 46 | Ex. 47 |
| --- | --- | --- | --- | --- | --- | --- |
| Specific activator | HBA | 594-61-6 | 3 | 3 | 3 | 3 |
| Cationic surfactant | Polyoxypropylene ethylene diamine | 25214-63-5 | 12 | 12 | 12 | 12 |
| | Polyethylene polypropylene bisaminopropyl ether | 65605-36-9 | 20 | 20 | 20 | 20 |
| | Oleylamine-EO adduct | 26635-93-8 | | | | |

TABLE 12-continued

| Material | | CAS No. | Ex. 44 | Ex. 45 | Ex. 46 | Ex. 47 |
|---|---|---|---|---|---|---|
| Nonionic surfactant | PEG2000 | 25322-68-3 | | | | |
| | PEG4000 | 25322-68-3 | 10 | 10 | 10 | 10 |
| | Cetyl alcohol EO adduct | 9004-95-9 | | | | |
| | Behenyl alcohol EO adduct | 71011-10-4 OR 26636-40-8 & 26636-39-5 | | | | |
| | Resorcinol EO adduct | 70356-25-1 | 35 | 35 | 35 | 35 |
| | Sorbitan monolaurate | 1338-39-2 | | | | |
| Organic acid | Succinic acid | 110-15-6 | | | | |
| | Glutaric acid | 110-94-1 | 0.5 | | | |
| | Malic acid | 6915-15-7 | | 0.5 | | |
| | Diglycolic acid | 110-99-6 | | | 0.5 | |
| | 2,2-Bis(hydroxymethyl) propionic acid | 4767-03-7 | | | | 0.5 |
| Amine activator | Imidazole | 288-32-4 | | | | |
| | 2-Ethylimidazole | 1072-62-4 | 2 | 2 | 2 | 2 |
| | 2-Methylimidazole | 693-98-1 | | | | |
| | Triethylenetetramine | 112-24-3 | 0.5 | 0.5 | 0.5 | 0.5 |
| | Triethylamine | 121-44-8 | | | | |
| Organophosphorus compound activator | Mono-2-ethylhexyl 2-ethylhexylphosphonate | 14802-03-0 | | | | |
| Organosulfur compound activator | Methanesulfonic acid | 75-75-2 | 1.5 | 1.5 | 1.5 | 1.5 |
| Organohalogen compound | 2,3-Dibromo-1,4-butanediol | 20163-90-0 | | | | |
| Amine hydrohalide | Ethylamine-HBr salt | 593-55-5 | | | | |
| Resin composition | Hydrogenated rosin | 65997-06-0 | | | | |
| Solvent | HeDG | 112-59-4 | | | | |
| | α-Terpineol | 98-55-5 | 15.5 | 15.5 | 15.5 | 15.5 |
| | Total | | 100 | 100 | 100 | 100 |
| | Void generation percentage | | ○ | ○ | ○ | ○ |

TABLE 13

| Material | | CAS No. | Ex. 48 | Ex. 49 | Ex. 50 | Ex. 51 |
|---|---|---|---|---|---|---|
| Specific activator | HBA | 594-61-6 | 3 | 3 | 3 | 3 |
| Cationic surfactant | Polyoxypropylene ethylene diamine | 25214-63-5 | 22 | 12 | 22 | 12 |
| | Polyethylene polypropylene bisaminopropyl ether | 65605-36-9 | 17 | 20 | 18 | 22 |
| | Oleylamine-EO adduct | 26635-93-8 | 7 | | 7 | |
| Nonionic surfactant | PEG2000 | 25322-68-3 | | | | |
| | PEG4000 | 25322-68-3 | 15 | 10 | 15 | 10 |
| | Cetyl alcohol EO adduct | 9004-95-9 | | | | |
| | Behenyl alcohol EO adduct | 71011-10-4 OR 26636-40-8 & 26636-39-5 | | | | |
| | Resorcinol EO adduct | 70356-25-1 | | 35 | | 35 |
| | Sorbitan monolaurate | 1338-39-2 | 3 | | 3 | |
| Organic acid | Succinic acid | 110-15-6 | 0.4 | 0.1 | 0.5 | 0.5 |
| | Glutaric acid | 110-94-1 | 0.4 | 0.1 | | |
| | Malic acid | 6915-15-7 | 0.4 | 0.1 | | |
| | Diglycolic acid | 110-99-6 | 0.4 | 0.1 | 1.5 | |
| | 2,2-Bis(hydroxymethyl) propionic acid | 4767-03-7 | 0.4 | 0.1 | | |
| Amine activator | Imidazole | 288-32-4 | | | | |
| | 2-Ethylimidazole | 1072-62-4 | | 2 | | |
| | 2-Methylimidazole | 693-98-1 | 0.5 | | | |
| | Triethylenetetramine | 112-24-3 | 0.5 | 0.5 | | |
| | Triethylamine | 121-44-8 | | | | |
| Organophosphorus compound activator | Mono-2-ethylhexyl 2-ethylhexylphosphonate | 14802-03-0 | | | | |
| Organosulfur compound activator | Methanesulfonic acid | 75-75-2 | | 1.5 | | 1.5 |
| Organohalogen compound | 2,3-Dibromo-1,4-butanediol | 20163-90-0 | | | | |
| Amine hydrohalide | Ethylamine-HBr salt | 593-55-5 | | | | |
| Resin composition | Hydrogenated rosin | 65997-06-0 | | | | |
| Solvent | HeDG | 112-59-4 | 30 | | 30 | |
| | α-Terpineol | 98-55-5 | | 15.5 | | 16 |
| | Total | | 100 | 100 | 100 | 100 |
| | Void generation percentage | | ○ | ○ | ○ | ○ |

TABLE 14

| | Material | CAS No. | Ex. 52 | Ex. 53 | Ex. 54 | Ex. 55 |
|---|---|---|---|---|---|---|
| Specific activator | HBA | 594-61-6 | 3 | 3 | 3 | 3 |
| Cationic surfactant | Polyoxypropylene ethylene diamine | 25214-63-5 | 22 | 12 | 22 | 22 |
| | Polyethylene polypropylene bisaminopropyl ether | 65605-36-9 | 17 | 20 | 17 | 17 |
| | Oleylamine-EO adduct | 26635-93-8 | 7 | | 7 | 7 |
| Nonionic surfactant | PEG2000 | 25322-68-3 | | | | |
| | PEG4000 | 25322-68-3 | 15 | 10 | 15 | 15 |
| | Cetyl alcohol EO adduct | 9004-95-9 | | | | |
| | Behenyl alcohol EO adduct | 71011-10-4 OR 26636-40-8 & 26636-39-5 | | | | |
| | Resorcinol EO adduct | 70356-25-1 | | 35 | | |
| | Sorbitan monolaurate | 1338-39-2 | 3 | | 3 | 3 |
| Organic acid | Succinic acid | 110-15-6 | 0.5 | 0.5 | 0.5 | 0.5 |
| | Glutaric acid | 110-94-1 | | | | |
| | Malic acid | 6915-15-7 | | | | |
| | Diglycolic acid | 110-99-6 | 1.5 | | 1.5 | 1.5 |
| | 2,2-Bis(hydroxymethyl) propionic acid | 4767-03-7 | | | | |
| Amine activator | Imidazole | 288-32-4 | | | 1 | |
| | 2-Ethylimidazole | 1072-62-4 | 4 | 4.5 | | 1 |
| | 2-Methylimidazole | 693-98-1 | 0.5 | | | |
| | Triethylenetetramine | 112-24-3 | 0.5 | 0.5 | | |
| | Triethylamine | 121-44-8 | | | | |
| Organophosphorus compound activator | Mono-2-ethylhexyl 2-ethylhexylphosphonate | 14802-03-0 | | | | |
| Organosulfur compound activator | Methanesulfonic acid | 75-75-2 | | 1.5 | | |
| Organohalogen compound | 2,3-Dibromo-1,4-butanediol | 20163-90-0 | | | | |
| Amine hydrohalide | Ethylamine-HBr salt | 593-55-5 | | | | |
| Resin composition | Hydrogenated rosin | 65997-06-0 | | | | |
| Solvent | HeDG | 112-59-4 | 26 | | 30 | 30 |
| | α-Terpineol | 98-55-5 | | 13 | | |
| | Total | | 100 | 100 | 100 | 100 |
| | Void generation percentage | | ○ | ○ | ○ | ○ |

TABLE 15

| | Material | CAS No. | Ex. 56 | Ex. 57 | Ex. 58 | Ex. 59 |
|---|---|---|---|---|---|---|
| Specific activator | HBA | 594-61-6 | 3 | 3 | 3 | 3 |
| Cationic surfactant | Polyoxypropylene ethylene diamine | 25214-63-5 | 22 | 22 | 22 | 12 |
| | Polyethylene polypropylene bisaminopropyl ether | 65605-36-9 | 17 | 17 | 17 | 20 |
| | Oleylamine-EO adduct | 26635-93-8 | 7 | 7 | 7 | |
| Nonionic surfactant | PEG2000 | 25322-68-3 | | | | |
| | PEG4000 | 25322-68-3 | 15 | 15 | 15 | 10 |
| | Cetyl alcohol EO adduct | 9004-95-9 | | | | |
| | Behenyl alcohol EO adduct | 71011-10-4 OR 26636-40-8 & 26636-39-5 | | | | |
| | Resorcinol EO adduct | 70356-25-1 | | | | 35 |
| | Sorbitan monolaurate | 1338-39-2 | 3 | 3 | 3 | |
| Organic acid | Succinic acid | 110-15-6 | 0.5 | 0.5 | 0.5 | 0.5 |
| | Glutaric acid | 110-94-1 | | | | |
| | Malic acid | 6915-15-7 | | | | |
| | Diglycolic acid | 110-99-6 | 1.5 | 1.5 | 1.5 | |
| | 2,2-Bis(hydroxymethyl) propionic acid | 4767-03-7 | | | | |
| Amine activator | Imidazole | 288-32-4 | | | | 2.5 |
| | 2-Ethylimidazole | 1072-62-4 | | | | |
| | 2-Methylimidazole | 693-98-1 | 1 | | | |
| | Triethylenetetramine | 112-24-3 | | 1 | | |
| | Triethylamine | 121-44-8 | | | 1 | |
| Organophosphorus compound activator | Mono-2-ethylhexyl 2-ethylhexylphosphonate | 14802-03-0 | | | | |
| Organosulfur compound activator | Methanesulfonic acid | 75-75-2 | | | | 1.5 |
| Organohalogen compound | 2,3-Dibromo-1,4-butanediol | 20163-90-0 | | | | |

TABLE 15-continued

| Material | | CAS No. | Ex. 56 | Ex. 57 | Ex. 58 | Ex. 59 |
|---|---|---|---|---|---|---|
| Amine hydrohalide | Ethylamine-HBr salt | 593-55-5 | | | | |
| Resin composition | Hydrogenated rosin | 65997-06-0 | | | | |
| Solvent | HeDG | 112-59-4 | 30 | 30 | 30 | |
| | α-Terpineol | 98-55-5 | | | | 15.5 |
| | Total | | 100 | 100 | 100 | 100 |
| | Void generation percentage | | ○ | ○ | ○ | ○ |

TABLE 16

| Material | | CAS No. | Ex. 60 | Ex. 61 | Ex. 62 |
|---|---|---|---|---|---|
| Specific activator | HBA | 594-61-6 | 3 | 3 | 3 |
| Cationic surfactant | Polyoxypropylene ethylene diamine | 25214-63-5 | 12 | 12 | 12 |
| | Polyethylene polypropylene bisaminopropyl ether | 65605-36-9 | 20 | 20 | 20 |
| | Oleylamine-EO adduct | 26635-93-8 | | | |
| Nonionic surfactant | PEG2000 | 25322-68-3 | | | |
| | PEG4000 | 25322-68-3 | 10 | 10 | 10 |
| | Cetyl alcohol EO adduct | 9004-95-9 | | | |
| | Behenyl alcohol EO adduct | 71011-10-4 OR 26636-40-8 & 26636-39-5 | | | |
| | Resorcinol EO adduct | 70356-25-1 | 35 | 35 | 35 |
| | Sorbitan monolaurate | 1338-39-2 | | | |
| Organic acid | Succinic acid | 110-15-6 | 0.5 | 0.5 | 0.5 |
| | Glutaric acid | 110-94-1 | | | |
| | Malic acid | 6915-15-7 | | | |
| | Diglycolic acid | 110-99-6 | | | |
| | 2,2-Bis(hydroxymethyl) propionic acid | 4767-03-7 | | | |
| Amine activator | Imidazole | 288-32-4 | | | |
| | 2-Ethylimidazole | 1072-62-4 | 2.5 | | |
| | 2-Methylimidazole | 693-98-1 | | 2.5 | |
| | Triethylenetetramine | 112-24-3 | | | |
| | Triethylamine | 121-44-8 | | | 2.5 |
| Organophosphorus compound activator | Mono-2-ethylhexyl 2-ethylhexylphosphonate | 14802-03-0 | | | |
| Organosulfur compound activator | Methanesulfonic acid | 75-75-2 | 1.5 | 1.5 | 1.5 |
| Organohalogen compound | 2,3-Dibromo-1,4-butanediol | 20163-90-0 | | | |
| Amine hydrohalide | Ethylamine-HBr salt | 593-55-5 | | | |
| Resin composition | Hydrogenated rosin | 65997-06-0 | | | |
| Solvent | HeDG | 112-59-4 | | | |
| | α-Terpineol | 98-55-5 | 15.5 | 15.5 | 15.5 |
| | Total | | 100 | 100 | 100 |
| | Void generation percentage | | ○ | ○ | ○ |

TABLE 17

| Material | | CAS No. | Ex. 63 | Ex. 64 | Ex. 65 | Ex. 66 |
|---|---|---|---|---|---|---|
| Specific activator | HBA | 594-61-6 | 3 | 3 | 3 | 3 |
| Cationic surfactant | Polyoxypropylene ethylene diamine | 25214-63-5 | 22 | 12 | 22 | 12 |
| | Polyethylene polypropylene bisaminopropyl ether | 65605-36-9 | 17 | 20 | 17 | 20 |
| | Oleylamine-EO adduct | 26635-93-8 | 7 | | 7 | |
| Nonionic surfactant | PEG2000 | 25322-68-3 | | | | |
| | PEG4000 | 25322-68-3 | 15 | 10 | 15 | 10 |
| | Cetyl alcohol EO adduct | 9004-95-9 | | | | |
| | Behenyl alcohol EO adduct | 71011-10-4 OR 26636-40-8 & 26636-39-5 | | | | |
| | Resorcinol EO adduct | 70356-25-1 | | 35 | | 35 |
| | Sorbitan monolaurate | 1338-39-2 | 3 | | 3 | |
| Organic acid | Succinic acid | 110-15-6 | 0.5 | 0.5 | 0.5 | 0.5 |
| | Glutaric acid | 110-94-1 | | | | |
| | Malic acid | 6915-15-7 | | | | |

TABLE 17-continued

| | Material | CAS No. | Ex. 63 | Ex. 64 | Ex. 65 | Ex. 66 |
|---|---|---|---|---|---|---|
| | Diglycolic acid | 110-99-6 | 1.5 | | 1.5 | |
| | 2,2-Bis(hydroxymethyl) propionic acid | 4767-03-7 | | | | |
| Amine activator | Imidazole | 288-32-4 | | | | |
| | 2-Ethylimidazole | 1072-62-4 | | 2 | | 2 |
| | 2-Methylimidazole | 693-98-1 | 0.5 | | 0.5 | |
| | Triethylenetetramine | 112-24-3 | 0.5 | 0.5 | 0.5 | 0.5 |
| | Triethylamine | 121-44-8 | | | | |
| Organophosphorus compound activator | Mono-2-ethylhexyl 2-ethylhexylphosphonate | 14802-03-0 | 3 | 3 | | |
| Organosulfur compound activator | Methanesulfonic acid | 75-75-2 | | 1.5 | 3 | 3 |
| Organohalogen compound | 2,3-Dibromo-1,4-butanediol | 20163-90-0 | | | | |
| Amine hydrohalide | Ethylamine-HBr salt | 593-55-5 | | | | |
| Resin composition | Hydrogenated rosin | 65997-06-0 | | | | |
| Solvent | HeDG | 112-59-4 | 27 | | 27 | |
| | α-Terpineol | 98-55-5 | | 12.5 | | 14 |
| | Total | | 100 | 100 | 100 | 100 |
| | Void generation percentage | | ○ | ○ | ○ | ○ |

TABLE 18

| | Material | CAS No. | Ex. 67 | Ex. 68 | Ex. 69 | Ex. 70 |
|---|---|---|---|---|---|---|
| Specific activator | HBA | 594-61-6 | 3 | 3 | 3 | 3 |
| Cationic surfactant | Polyoxypropylene ethylene diamine | 25214-63-5 | 22 | 12 | 22 | 12 |
| | Polyethylene polypropylene bisaminopropyl ether | 65605-36-9 | 17 | 20 | 17 | 20 |
| | Oleylamine-EO adduct | 26635-93-8 | 7 | | 7 | |
| Nonionic surfactant | PEG2000 | 25322-68-3 | | | | |
| | PEG4000 | 25322-68-3 | 15 | 10 | 15 | 10 |
| | Cetyl alcohol EO adduct | 9004-95-9 | | | | |
| | Behenyl alcohol EO adduct | 71011-10-4 OR 26636-40-8 & 26636-39-5 | | | | |
| | Resorcinol EO adduct | 70356-25-1 | | 35 | | 35 |
| | Sorbitan monolaurate | 1338-39-2 | 3 | | 3 | |
| Organic acid | Succinic acid | 110-15-6 | 0.5 | 0.5 | 0.5 | 0.5 |
| | Glutaric acid | 110-94-1 | | | | |
| | Malic acid | 6915-15-7 | | | | |
| | Diglycolic acid | 110-99-6 | 1.5 | | 1.5 | |
| | 2,2-Bis(hydroxymethyl) propionic acid | 4767-03-7 | | | | |
| Amine activator | Imidazole | 288-32-4 | | | | |
| | 2-Ethylimidazole | 1072-62-4 | | 2 | | 2 |
| | 2-Methylimidazole | 693-98-1 | 0.5 | | 0.5 | |
| | Triethylenetetramine | 112-24-3 | 0.5 | 0.5 | 0.5 | 0.5 |
| | Triethylamine | 121-44-8 | | | | |
| Organophosphorus compound activator | Mono-2-ethylhexyl 2-ethylhexylphosphonate | 14802-03-0 | | | | |
| Organosulfur compound activator | Methanesulfonic acid | 75-75-2 | | 1.5 | | 1.5 |
| Organohalogen compound | 2,3-Dibromo-1,4-butanediol | 20163-90-0 | 5 | 5 | | |
| Amine hydrohalide | Ethylamine-HBr salt | 593-55-5 | | | 2 | 2 |
| Resin composition | Hydrogenated rosin | 65997-06-0 | | | | |
| Solvent | HeDG | 112-59-4 | 25 | | 28 | |
| | α-Terpineol | 98-55-5 | | 10.5 | | 13.5 |
| | Total | | 100 | 100 | 100 | 100 |
| | Void generation percentage | | ○ | ○ | ○ | ○ |

TABLE 19

| | Material | CAS No. | Ex. 71 | Ex. 72 | Ex. 73 | Ex. 74 |
|---|---|---|---|---|---|---|
| Specific activator | HBA | 594-61-6 | 3 | 3 | 3 | 3 |
| Cationic surfactant | Polyoxypropylene ethylene diamine | 25214-63-5 | 22 | 12 | 11 | 6 |

TABLE 19-continued

| | Material | CAS No. | Ex. 71 | Ex. 72 | Ex. 73 | Ex. 74 |
|---|---|---|---|---|---|---|
| | Polyethylene polypropylene bisaminopropyl ether | 65605-36-9 | 17 | 20 | 8 | 10 |
| | Oleylamine-EO adduct | 26635-93-8 | 7 | | 4 | |
| Nonionic surfactant | PEG2000 | 25322-68-3 | | | | |
| | PEG4000 | 25322-68-3 | 15 | 10 | 8 | 5 |
| | Cetyl alcohol EO adduct | 9004-95-9 | | | | |
| | Behenyl alcohol EO adduct | 71011-10-4 OR 26636-40-8 & 26636-39-5 | | | | |
| | Resorcinol EO adduct | 70356-25-1 | | 35 | | |
| | Sorbitan monolaurate | 1338-39-2 | 3 | | 1 | |
| Organic acid | Succinic acid | 110-15-6 | 0.5 | 0.5 | | |
| | Glutaric acid | 110-94-1 | | | | |
| | Malic acid | 6915-15-7 | | | | |
| | Diglycolic acid | 110-99-6 | 1.5 | | | |
| | 2,2-Bis(hydroxymethyl) propionic acid | 4767-03-7 | | | | |
| Amine activator | Imidazole | 288-32-4 | | | | |
| | 2-Ethylimidazole | 1072-62-4 | | | 2 | |
| | 2-Methylimidazole | 693-98-1 | 0.5 | | | |
| | Triethylenetetramine | 112-24-3 | 0.5 | 0.5 | | |
| | Triethylamine | 121-44-8 | | | | |
| Organophosphorus compound activator | Mono-2-ethylhexyl 2-ethylhexylphosphonate | 14802-03-0 | | | | |
| Organosulfur compound activator | Methanesulfonic acid | 75-75-2 | | | 1.5 | |
| Organohalogen compound | 2,3-Dibromo-1,4-butanediol | 20163-90-0 | | | | |
| Amine hydrohalide | Ethylamine-HBr salt | 593-55-5 | | | | |
| Resin composition | Hydrogenated rosin | 65997-06-0 | 5 | 5 | | |
| Solvent | HeDG | 112-59-4 | 25 | | | |
| | α-Terpineol | 98-55-5 | | 10.5 | 65 | 76 |
| | Total | | 100 | 100 | 100 | 100 |
| | Void generation percentage | | ○ | ○ | ○ | ○ |

TABLE 20

| | Material | CAS No. | Ex. 75 | Ex. 76 | Ex. 77 | Ex. 78 |
|---|---|---|---|---|---|---|
| Specific activator | HBA | 594-61-6 | 3 | 3 | 3 | 3 |
| Cationic surfactant | Polyoxypropylene ethylene diamine | 25214-63-5 | 22 | 12 | 22 | 12 |
| | Polyethylene polypropylene bisaminopropyl ether | 65605-36-9 | 17 | 20 | 17 | 15 |
| | Oleylamine-EO adduct | 26635-93-8 | 7 | | 7 | 5 |
| Nonionic surfactant | PEG2000 | 25322-68-3 | | | 3 | 3 |
| | PEG4000 | 25322-68-3 | 15 | 10 | 3 | 3 |
| | Cetyl alcohol EO adduct | 9004-95-9 | | | 3 | 3 |
| | Behenyl alcohol EO adduct | 71011-10-4 OR 26636-40-8 & 26636-39-5 | | | 3 | 3 |
| | Resorcinol EO adduct | 70356-25-1 | | 35 | 3 | 30 |
| | Sorbitan monolaurate | 1338-39-2 | 3 | | 3 | 3 |
| Organic acid | Succinic acid | 110-15-6 | 0.5 | 0.5 | 0.4 | 0.1 |
| | Glutaric acid | 110-94-1 | | | 0.4 | 0.1 |
| | Malic acid | 6915-15-7 | | | 0.4 | 0.1 |
| | Diglycolic acid | 110-99-6 | 1.5 | | 0.4 | 0.1 |
| | 2,2-Bis(hydroxymethyl) propionic acid | 4767-03-7 | | | 0.4 | 0.1 |
| Amine activator | Imidazole | 288-32-4 | | | 0.1 | 0.5 |
| | 2-Ethylimidazole | 1072-62-4 | | 2 | 0.1 | 0.5 |
| | 2-Methylimidazole | 693-98-1 | 0.5 | | 0.1 | 0.5 |
| | Triethylenetetramine | 112-24-3 | 0.5 | 0.5 | 0.1 | 0.5 |
| | Triethylamine | 121-44-8 | | | 0.1 | 0.5 |
| Organophosphorus compound activator | Mono-2-ethylhexyl 2-ethylhexylphosphonate | 14802-03-0 | | | 1 | 1 |
| Organosulfur compound activator | Methanesulfonic acid | 75-75-2 | | 1.5 | 1.5 | 1.5 |
| Organohalogen compound | 2,3-Dibromo-1,4-butanediol | 20163-90-0 | | | 1 | 1 |

TABLE 20-continued

| Material | | CAS No. | Ex. 75 | Ex. 76 | Ex. 77 | Ex. 78 |
|---|---|---|---|---|---|---|
| Amine hydrohalide | Ethylamine-HBr salt | 593-55-5 | | | 0.5 | 0.5 |
| Resin composition | Hydrogenated rosin | 65997-06-0 | | | 1 | 1 |
| Solvent | HeDG | 112-59-4 | 15 | 7.5 | 15 | 10 |
| | α-Terpineol | 98-55-5 | 15 | 8 | 10.5 | 2 |
| | Total | | 100 | 100 | 100 | 100 |
| | Void generation percentage | | ○ | ○ | ○ | ○ |

As is clear from Tables 1 to 20, the fluxes of Examples 1 to 78 showed results that the generation of voids in the solder joint portion was sufficiently suppressed. The detail of the reason for having obtained the excellent results is not clear, but the present inventors infer it as described below. Since the volatilization temperature of HBA is near the reflow temperature range, HBA in the flux would volatilize while exhibiting activity during the reflow. Therefore, no HBA would remain in the solder joint portion after the reflow, and thus the generation of voids derived from HBA would be suppressed. In addition, since HBA is added to the flux, the content of the cationic surfactant and the nonionic surfactant in the entire flux relatively decreases, and thus the generation of voids derived from these surfactants would be suppressed.

On the other hand, in the fluxes of Comparative Examples 1 and 2, it was found that it was not possible to avoid the generation of voids in the solder joint portion. This result supports a conjecture regarding the contents of the above-described surfactants.

The invention claimed is:

1. A flux containing:
0.1 to 20 wt % of 2-hydroxyisobutyric acid as an activator;
10 to 60 wt % of a cationic surfactant; and
5 to 60 wt % of a nonionic surfactant.

2. The flux according to claim 1,
wherein a content of the 2-hydroxyisobutyric acid is 1 to 10 wt %.

3. The flux according to claim 1,
wherein the cationic surfactant is an alkylene oxide adduct of an aliphatic monoamine or aliphatic diamine.

4. The flux according to claim 1,
wherein the nonionic surfactant is at least one selected from the group consisting of an alkylene oxide adduct of an aliphatic monohydric alcohol, aromatic polyhydric alcohol and a sorbitan fatty acid ester.

5. The flux according to claim 1, further containing:
a co-activator,
wherein the co-activator is at least one of an organic acid other than the 2-hydroxyisobutyric acid, an amine, an organophosphorus compound, an organosulfur compound, an organohalogen compound and an amine hydrohalide.

6. The flux according to claim 5,
wherein a content of the other organic acid is more than 0 wt % and 10 wt % or less.

7. The flux according to claim 5,
wherein a content of the amine is more than 0 wt % and 5 wt % or less.

8. The flux according to claim 5,
wherein a content of the organophosphorus compound is more than 0 wt % and 3 wt % or less.

9. The flux according to claim 5,
wherein a content of the organosulfur compound is more than 0 wt % and 3 wt % or less.

10. The flux according to claim 5,
wherein a content of the organohalogen compound is more than 0 wt % and 5 wt % or less.

11. The flux according to claim 5,
wherein a content of the amine hydrohalide is more than 0 wt % and 2 wt % or less.

12. The flux according to claim 1, further containing more than 0 wt % and 5 wt % or less of a resin composition.

13. The flux according to claim 1, further containing more than 0 wt % and 76 wt % or less of a solvent.

14. A solder paste containing:
a flux containing:
0.1 to 20 wt % of 2-hydroxyisobutyric acid as an activator;
10 to 60 w t% of a cationic surfactant; and
5 to 60 wt % of a nonionic surfactant; and
a metal powder.

* * * * *